Figure 1:
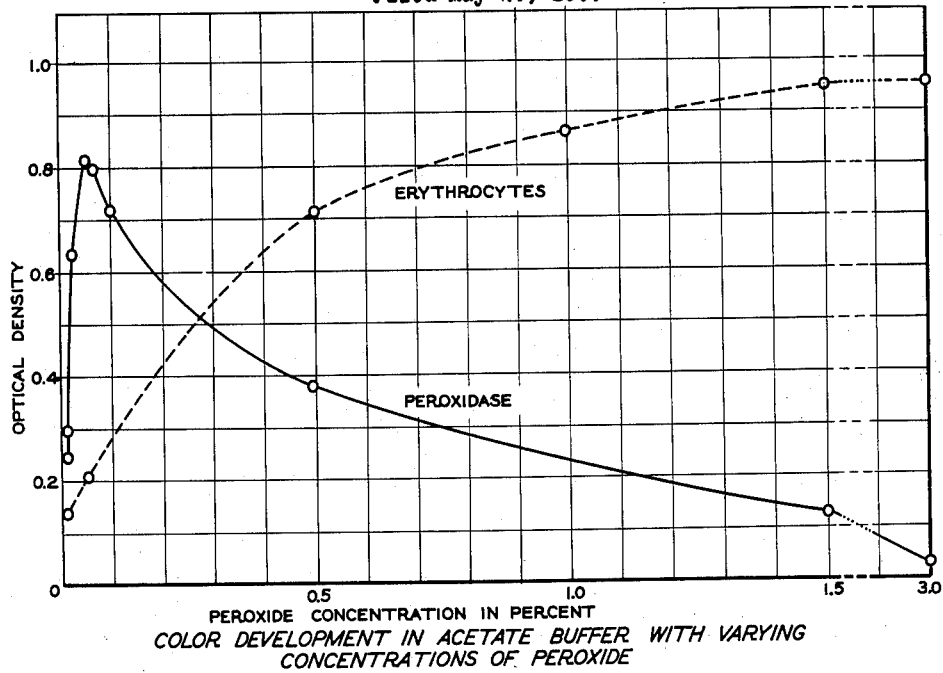

COLOR DEVELOPMENT IN ACETATE BUFFER WITH VARYING CONCENTRATIONS OF PEROXIDE

COLOR DEVELOPMENT IN CITRATE BUFFER WITH VARYING CONCENTRATIONS OF PEROXIDE

United States Patent Office 3,087,794
Patented Apr. 30, 1963

3,087,794
CHEMICAL TEST FOR DIFFERENTIATING LEUCOCYTES FROM ERYTHROCYTES
Alfred H. Free and Helen M. Free, Elkhart, Ind., assignors to Miles Laboratories, Inc., Elkhart, Ind., a corporation of Indiana
Filed May 23, 1960, Ser. No. 31,028
8 Claims. (Cl. 23—253)

This invention relates to a novel method and means for determining the presence or absence of certain naturally occurring products in various media, such as body fluids and the like. More particularly, it relates to a method and means for determining the presence of substances having peroxidative activity which can be present in various media. It is also directed to a method and means for differentiating leucocytes from erythrocytes, particularly in the testing of urine, based on the presence of such substances having peroxidative activity therein.

Among materials having peroxidative activity may be included many organic and inorganic preparations. Thus various plant peroxidases, such as horseradish peroxidase, potato peroxidase have this property. Also such substances as normal whole blood, red blood cells alone, lyophilized whole blood and like substances have peroxidative activity. In addition potassium iodide and sodium molybdate, as well as such other iodides as sodium and ammonium iodides and other molybdates such as potassium and ammonium molybdates have such peroxidative activity. Urohemin and a number of other porphyrin substances also have peroxidative activity. Thus in metalloprophyrins, although hemin is preferred, various complex-forming compounds which activate certain other metalloporphyrins not operable per se, especially when used with such activators as 2-aminobenzothiazole, pyridine, bipyridyl, bipyridylpyridine, nicotinic acid or the like yield a complex having considerable peroxidative activity. Other substances which are not enzymes but have peroxidative activity include such compounds as iron sulfocyanate, iron tannate, ferrous ferrocyanide, poatssium chromic sulfate, and others.

The substances coming from different natural sources have distinguishable specific properties, and the presence of such substances having peroxidative activity may be recognized by their effect in catalyzing the oxidation of certain indicator compounds or dye precursors in the presence of hydrogen peroxide to give a readily perceptible color change. Typical of such catalytically oxidizable compounds are orthotolidine, benzidine, dianisidine, guaiac, phenylene diamine, 2,7-diaminofluorene dihydrochloride, etc.

The present invention provides a novel and highly effective means for detecting the presence of substances having peroxidative activity in various materials including body fluids, particularly urine, and for differentiating such substances from different sources and thereby determining the presence both of these peroxidatively active substances themselves and also of the products containing them. In urine, blood cells (hematuria) or blood pigment (hemoglobinuria) may be found in typhus, scurvy, purpura, pyemia, nephritis, renal calculi, as the result of a burn extending over a large part of the body, by the action of various hemolytic toxins, etc. The diagnostic composition embodied herein is simple, economical, rapid, convenient and reliable and does not require the services of an experienced technologist or the use of any additional steps such as heating and is free of many of the disadvantages which characterize prior processes, testing means and procedures.

In general, the present invention involves contacting the unknown material, which may contain a substance having peroxidative activity, with one of the heretofore described oxidizable compounds, or equivalents thereof, in the presence of hydrogen peroxide. The test may take numerous forms; thus if the unknown be in liquid form, a drop of the liquid may be contacted with a test indicator in the form of paper strips or the like which have been impregnated with a mixture composed of the oxidizable compounds above mentioned and a peroxide; or in place of such a bibulous product, splinters, sticks or strips made of wood, fiber, glass, metal or plastic using an adhesive for effecting adhesion of the components of the test material may be used. Such "sticks" will turn color when moistened with a material containing the substance having peroxidative activity. The unknown material, in the form of a body fluid may be contacted with the composition of this invention by making the composition into a suspension or a solution which is then used to impregnate a bibulous material such as paper, wood or the like. As above implied, if the unknown is a non-liquid material, an aqueous solution, suspension or extract thereof can be used.

Alternatively, our test composition may be formed into a tablet and the test performed by applying the material to be tested, or an extract thereof, to the tablet, e.g., by placing a drop or two of suspect urine, if that be the unknown, on the face of the tablet, and observing whether or not color formation occurs.

To determine qualitatively whether a certain peroxidase is present in a specimen, one drop of the material to be tested is deposited on a measured quantity of the dry composition, e.g. in the form of a five grain tablet. Alternatively, the dry composition may be suspended in water and mixed with the material to be tested. In the presence of such a material having a specific peroxidative activity, a color change (i.e. from colorless to blue or green) will be obtained at a given time or over a fixed time interval.

A semi-quantitative estimation of the amount of peroxidase present in the specimen may be made by measuring the time required for the first definite color change (i.e. from colorless to blue or green coloration) to be observed. For example, a definite color change developed within thirty seconds can be reported as four plus (4+), thirty seconds to one minute—three plus (3+), one minute to two minutes—two plus (2+), two minutes to three minutes—one plus (1+), three minutes to 5 minutes—plus minus or trace. If no definite coloration is obtained after five minutes, the test is reported as negative. Alternatively, a semi-quantitative estimation of the amount of substance having peroxidative activity present in the specimen may be obtained by observing the intensity of color development effected over a specific time interval (i.e. two minutes) during which the test composition is contacted with the substance being tested. A simple color intensity chart based on the distinct color intensities developed by predetermined concentrations of substances having peroxidative activity may be conveniently prepared for use in testing in accordance with this invention. Comparison with such charts gives a more exact quantitative determination of the peroxidative activity of a substance present in a test sample.

The basic equation involved in the reactions which take place in the performance of our test may be represented as follows:

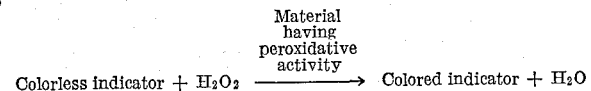

Colorless indicator + $H_2O_2$ $\xrightarrow{\text{Material having peroxidative activity}}$ Colored indicator + $H_2O$ The foregoing reaction is, of course, influenced to some extent by the concentration of peroxide, indicator, hydrogen ions, as well as by the presence or absence of various other ions. While the influence of these variables is different with different substances having peroxidative activity, by careful adjustment of peroxide concentration, pH and indicator concentration and choice of indicator, buffer and the presence of other ions, those skilled in the art will readily appreciate that various catalytically active substances (substances having peroxidative activity) can be differentiated under a given set of conditions; our invention is exemplified in this regard in the examples hereinafter set forth:

EXAMPLE 1

A test solution was made up containing the following:
3 ml. $H_2O$
1 ml. 0.6% orthotolidine base in citric acid at pH 3.0
1 ml. hydrogen peroxide.

The hydrogen peroxide was added in 1 ml. portions and in concentrations varying from as low as 0.03% up to 30% to form test solutions which when mixed with 1 ml. test specimens gave final test reaction mixtures having a peroxide concentration varying from 0.005% to 5.0% as shown in Table 1 below. It was found that this solution when contacted with a 1 ml. test sample containing 5 gammas of horseradish peroxidas gave a 3+ reaction when the concentration of peroxide was 1.0% as added and 0.17% in the final test reaction mixture. The same solution gave a trace to negative reaction with comparable quantities of erythrocytes (red blood cells) lysed in a fluid such as water to a concentration of 5 gammas of hemoglobin, when the concentration of peroxide was 1% as added and 0.17% in the final test reaction mixture. However, increasing the peroxide concentration to 30% as added and hence in the test solution to 5% was found to decrease the reaction of the horseradish peroxidase to 1+; under the same circumstances, the above erythrocyte test sample having a concentration of 5 gammas of hemoglobin will also react to give a 1+ color indication. For best results, peroxide concentration should be 1% or less as added and hence in the final test reaction mixture about 0.17% or less, the other ingredients remaining unchanged. As shown above a peroxide concentration of about 0.17% in the final test reaction mixing gives sharply distinguishable coloration for test samples containing horseradish peroxidase compared to test samples containing erythrocytes.

These tests are summarized in Table 1.

*Table 1*

| Concentration of $H^2O^2$ in final test reaction, percent | 0.005 | 0.17 | 1.7 | 5 |
|---|---|---|---|---|
| Concentration of $H^2O^2$ as added, percent | .03 | 1.0 | 10 | 30 |
| Horseradish, 50 gamma | 4 | 4 | 4 | 3 |
| Peroxidase, 5 gamma | 4 | 3 | 2 | a 1 |
| Erythrocytes lysed in water: | | | | |
| 50 gamma—concentration of hemoglobin | 0 | 1 | 2 | 2 |
| 5 gamma—concentration of hemoglobin | 0 | a 0 | 1 | 1 | a Trace to.

It is to be noted from the above table that with 0.005% to about 0.17% concentration of peroxide in the final test reaction mixture, the test gives a clear color distinction for detecting the presence of horseradish peroxidase as distinguished from erythrocytes. Thus at the 0.005% hydrogen peroxide concentration the test gives a strong positive color reaction for horseradish peroxidase and a negative reaction for erythrocytes. This is a far more conclusive test for distinguishing these substances than that obtained with test compositions of the prior art as given below in Example 3.

Figure 2:
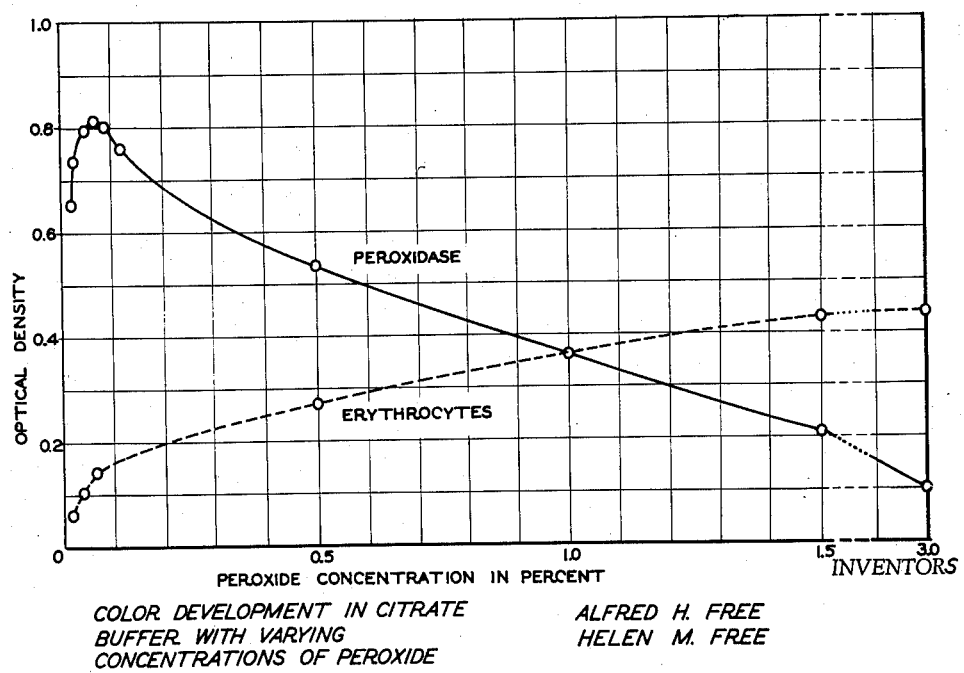

The graphs shown in FIGS. 1 and 2 summarize a series of peroxidase and erythrocyte tests carried out at various peroxide concentrations. These tests show that there is a decrease in intensity of color development for peroxidase at higher concentrations of peroxide whereas the tests show an increase in intensity of color development for test samples containing erythrocytes at higher concentrations of peroxide.

The data for FIG. 1 was obtained while using a test formulation prepared by making a buffer solution containing 11.4 ml. of glacial acetic acid (99.6%; 1.04 specific gravity) and adding 1.52 gm. of sodium hydroxide as 2 ml. of a saturated solution of sodium hydroxide and then adding distilled water to the mixture to make 100 ml. 7 ml. of this buffer solution, 1 ml. of o-tolidine dihydrochloride (0.6% solution) and 1 ml. of a hydrogen peroxide solution of 20% concentration were mixed together to form a test solution of pH about 4.8 and containing about 2.0% hydrogen peroxide. By using various other concentrations of hydrogen peroxide the color development in tests carried out with test samples containing peroxidase and test samples containing erythrocytes can be readily determined, marked on the graph and the curves drawn. In a test for erythrocytes, usually 1 ml. of a body fluid is added. For a peroxidase test, a 1 ml. portion of a peroxidase enzyme is added to the test solution. Preferably, color formation at the end of two minutes is noted and with o-tolidine as the indicator the development of a blue color may be measured in a spectrophotometer or colorimeter at 600 millimicrons wave length.

FIGURE 2 is a similar graphical study summarizing color development in erythrocyte and peroxidase test samples while utilizing the test composition described in the above paragraph but having a citrate buffer. The approximate cross-over point at about 1.0% concentration of $H_2O_2$ where color development is about equal for erythrocyte and peroxidase test samples is clearly shown in the graph. In this graph the peroxidase curve shows little change from FIG. 1 but the curve for the erythrocyte tests is shown depressed to about half the color density shown in the acetate buffer graph of FIG. 1.

These graphs show that the maximum color development with peroxidase is reached at a comparatively low level of peroxide, below about 0.05%, $H_2O_2$ concentration, and then falls rapidly with higher concentrations of peroxide. In contrast, the color development with erythrocyte test samples is minimal with low concentrations of peroxide and only reaches a maximum at levels of 1.5 to 3% concentration of $H_2O_2$.

EXAMPLE 2

Strips of bibulous filter papers similar to those described in U.S. Patent No. 2,848,308 were impregnated with a solution composed of glucose, glucose oxidase, citrate buffer and orthotolidine and dried. In use, these paper strips were found to be more sensitive for the detection of horseradish peroxidase in urine than were any of the test compositions described in U.S. Patent No. 2,799,660, an example of which is given below.

EXAMPLE 3

A suspension of leucocytes (white blood cells) was separated from dog blood by conventional means and the suspension was then diluted so that it gave a 1+ reaction with a prior art diagnostic made in accordance with U.S. Patent No. 2,799,660 by placing one drop of the above diluted suspension on a filter paper square laid out on a white non-absorbent paper; when the drop had soaked into the filter paper, a tablet containing orthotolidine, strontium peroxide, calcium acetate, tartaric acid, sodium bicarbonate and red dye was placed in the center of the wetted area, and two drops of water added so that they fell on the tablet and ran over on to the paper; a diffuse light blue color appearing on the filter paper within two minutes gave the above one plus indication.

A test sample of this same diluted suspension of leucocytes gave a positive reaction when 2 ml. thereof was added to 1 ml. of orthotolidine dihydrochloride (0.6% solution), 0.5 ml. of hydrogen peroxide of 0.3% concentration and 0.2 ml. of sodium citrate (10% solution). This test reaction mixture had a hydrogen peroxide concentration of less than 0.1%.

A comparable solution of erythrocytes which gave an equivalent 1+ reaction with the aforesaid prior art diagnostic test, gave a negative reaction when 2 ml. of this erythrocyte solution was added to the test composition of the above paragraph.

By the substitution of 30% $H_2O_2$ for the 0.3% $H_2O_2$ and elimination of the citrate, the solution of erythrocytes gave a clearly positive reaction and the solution of leucocytes gave a negative reaction. Although it is not to be deemed a limitation of the inventive concept herein involved, it is believed that the reduction in the velocity of the reaction in the case of the solution containing the leucocytes is perhaps explained by the inactivation of the leucocytes in the presence of excessively high concentrations of $H_2O_2$. In contrast thereto, the erythrocytes are believed to react more in the nature of a chemical type of reaction rather than an enzymatic type of reaction and hence show greater reactivity in the presence of increased $H_2O_2$ concentration. The graphs shown in FIGS. 1 and 2 confirm this with respect to the similar inactivation of the leucocyte solution and the increasing activation of the erythrocyte solution in the presence of increasing $H_2O_2$ concentration.

While certain proportions of preferred ingredients have been specified and have been described as useful to a greater or lesser degree in producing the bibulous paper strips or tablets of this invention, these proportions may be varied of course within the skill of the art.

In addition to the orthotolidine indicator or dye precursor given in the above examples, such indicators as aniline and its derivatives, o-toluidine, p-toluidine, o-phenylenediamine, N,N'-dimethyl-p-phenylenediamine, N.N'-diethyl-p-phenylenediamine, benzidine, dianisidine, o-cresol, m-cresol, p-cresol, alpha-naphthol, beta-naphthol, catechol, guaiacol, pyrogallol, etc., may be used.

In addition to the citrate buffer described above, other buffers such as tartrate, phosphate, phthalate, acetate and mixtures thereof may be used. Accordingly, it is to be understood that the above examples are illustrative only and are not to be construed in strictly limiting sense.

It will be apparent from the above specific examples that our invention has wide applicability to the differentiation and detection of materials by the determination of the presence or absence of substances having peroxidative activity in such materials. Where one material contains substantially more of such substances having peroxidative activity than another, the respective materials may be similarly differentiated by utilizing the principles of our invention.

What is claimed is:

1. A composition for detecting erythrocytes by their hemin content when present in a body fluid also containing leucocytes with their peroxidase content which composition comprises a bibulous stick impregnated with hydrogen peroxide and an organic indicator compound which forms a colored oxidation product in the presence of peroxide and peroxidase and in the presence of peroxide and hemin, the hydrogen peroxide being 1.5% to 5.0% concentration when said stick is wet by said body fluid, said concentration of hydrogen peroxide being effective to decrease the intensity of color development due to leucocytes while increasing the intensity of color development due to erythrocytes.

2. A composition according to claim 1 wherein the hydrogen peroxide concentration is 5.0%.

3. A composition for detecting leucocytes by their peroxidase content when present in a body fluid also containing erythrocytes with their hemin content which composition comprises a bibulous stick impregnated with hydrogen peroxide and an organic indicator compound which forms a colored oxidation product in the presence of peroxide and hemin and in the presence of peroxide and peroxidase, the hydrogen peroxide being of 0.005% to 0.1% concentration when said stick is wet by said body fluid, said concentration of hydrogen peroxide being effective to decrease the intensity of color development due to erythrocytes while increasing the intensity of color development due to leucocytes.

4. A composition according to claim 3 wherein the hydrogen peroxide concentration is 0.005%.

5. A composition for detecting erythrocytes by their hemin content when present in a body fluid also containing leucocytes with their peroxidase content, which compositon comprises hydrogen peroxide and an organic indicator compound which forms a colored oxidation product in the presence of peroxide and peroxidase and in the presence of peroxide and hemin, the hydrogen peroxide being of 1.5% to 5.0% concentration when said compositon is contacted by said body fluid, said concentration of hydrogen peroxide being effective to decrease the intensity of color development due to leucocytes while increasing the intensity of color development due to erythrocytes.

6. A composition according to claim 5 wherein the concentration of hydrogen peroxide is 5.0%.

7. A composition for detecting leucocytes by their peroxidase content when present in a body fluid also containing erythrocytes with their hemin content, which composition comprises hydrogen peroxide and an organic indicator compound which forms a colored oxidation product in the presence of peroxide and hemin and in the presence of peroxide and peroxidase, the hydrogen peroxide being of 0.005% to 0.1% concentration when said composition is contacted by said body fluid, said concentration of hydrogen peroxide being effective to decrease the intensity of color development due to erythrocytes while increasing the color development due to leucocytes.

8. A composition according to claim 7 wherein the concentration of hydrogen peroxide is 0.005%.

References Cited in the file of this patent

UNITED STATES PATENTS 2,905,594     Morris _____ Sept. 22, 1959

OTHER REFERENCES

Hawk, Oser and Summerson: "Practical Physiological Chemistry," published by The Blakiston Co., Phila., Pa., 1947, 12th Ed., pages 433–434, 437.